(12) United States Patent
Guen et al.

(10) Patent No.: US 9,728,762 B2
(45) Date of Patent: Aug. 8, 2017

(54) RECHARGEABLE BATTERY

(71) Applicant: SAMSUNG SDI CO., LTD., Yongin-si, Gyeonggi-do (KR)

(72) Inventors: Min-Hyung Guen, Yongin-si (KR); Chi-Young Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 298 days.

(21) Appl. No.: 14/562,585

(22) Filed: Dec. 5, 2014

(65) Prior Publication Data
US 2015/0263329 A1 Sep. 17, 2015

(30) Foreign Application Priority Data
Mar. 17, 2014 (KR) .................. 10-2014-0030927

(51) Int. Cl.
*H01M 2/34* (2006.01)
*H01M 2/12* (2006.01)
*H01M 2/30* (2006.01)

(52) U.S. Cl.
CPC ......... *H01M 2/345* (2013.01); *H01M 2/1241* (2013.01); *H01M 2/1252* (2013.01); *H01M 2/30* (2013.01); *H01M 2200/20* (2013.01)

(58) Field of Classification Search
None
See application file for complete search history.

(56) References Cited

U.S. PATENT DOCUMENTS

2010/0021810 A1* 1/2010 Zhu .................. H01M 2/04
429/175
2010/0323234 A1 12/2010 Kim et al.
(Continued)

FOREIGN PATENT DOCUMENTS

EP 2 284 932 A1 2/2011
EP 2 357 685 A1 8/2011
(Continued)

OTHER PUBLICATIONS

EPO Office Action dated Jun. 21, 2016, for corresponding European Patent Application No. 15158339.0 (5 pages).
(Continued)

*Primary Examiner* — Scott J Chmielecki
(74) *Attorney, Agent, or Firm* — Lewis Roca Rothgerber Christie LLP (57) ABSTRACT

An exemplary embodiment of the present invention provides a rechargeable battery with an external short-circuit part having an advantage of preventing foreign materials and moisture from the outside from permeating as well as discharging internal pressure when a membrane is inversely deformed. A rechargeable battery according to an exemplary embodiment of the present invention includes: a case for accommodating an electrode assembly; a cap plate for sealing an opening of the case; a first electrode terminal and a second electrode terminal provided to penetrate the cap plate so as to be electrically connected to the electrode assembly; and an external short-circuit part electrically separating or short-circuiting the first and second electrode terminals outside of the electrode assembly. The external short-circuit part includes a membrane for sealing a short-circuit hole formed in the cap plate.

13 Claims, 9 Drawing Sheets (56) References Cited

U.S. PATENT DOCUMENTS

| | | | | |
|---|---|---|---|---|
| 2011/0039136 A1* | 2/2011 | Byun | ............... | H01M 2/0404 |
| | | | | 429/56 |
| 2012/0052341 A1* | 3/2012 | Kim | ............... | H01M 2/043 |
| | | | | 429/53 |
| 2012/0315513 A1* | 12/2012 | Ro | ............... | H01M 2/0413 |
| | | | | 429/53 |
| 2012/0315515 A1* | 12/2012 | Guen | ............... | H01M 2/0473 |
| | | | | 429/56 |
| 2015/0111069 A1* | 4/2015 | Han | ............... | H01M 2/1252 |
| | | | | 429/7 |
| 2015/0280203 A1* | 10/2015 | Guen | ............... | H01M 2/345 |
| | | | | 429/61 |

FOREIGN PATENT DOCUMENTS

| | | |
|---|---|---|
| EP | 2 500 959 A1 | 9/2012 |
| EP | 2 544 264 A1 | 1/2013 |
| EP | 2919292 A1 | 9/2015 |
| KR | 10-2012-0104911 | 9/2012 |
| KR | 10-2013-0013787 | 2/2013 |

OTHER PUBLICATIONS

EPO Search Report dated Jun. 25, 2015, for corresponding European Patent application 15158339.0, (3 pages).

EPO Office Action dated Nov. 21, 2016, for corresponding European Patent Application No. 15158339.0 (5 pages).

* cited by examiner

RECHARGEABLE BATTERY

CROSS-REFERENCE TO RELATED APPLICATION

This application claims priority to and the benefit of Korean Patent Application No. 10-2014-0030927 filed in the Korean Intellectual Property Office on Mar. 17, 2014, the entire contents of which are incorporated herein by reference.

BACKGROUND

1. Field

The described technology relates generally to a rechargeable battery with an external short-circuit part.

2. Description of the Related Art

A rechargeable battery differs from a primary battery in that it can be repeatedly charged and discharged, while the latter is not designed to be recharged.

A low-capacity rechargeable battery is used in small portable electronic devices such as mobile phones, notebook computers, and camcorders, while a high-capacity rechargeable battery can be used as a power source for driving a motor of a hybrid vehicle and the like.

A rechargeable battery includes an electrode assembly formed by disposing a positive electrode and a negative electrode at respective surfaces of a separator, a case for accommodating the electrode assembly, and a cap assembly for sealing an opening of the case, and negative and positive electrode terminals electrically connected to the electrode assembly while being provided to extend through the cap assembly.

While being repeatedly charged and discharged, the rechargeable battery may generate excessive heat inside of the case, or an electrolyte solution may be decomposed therein.

Such heat generation or electrolyte solution decomposition may increase an internal pressure of the rechargeable battery.

The increased internal pressure may cause ignition or explosion of the rechargeable battery.

Thus, in order to prevent the ignition and explosion of the rechargeable battery as a result of increased internal pressure, the case may be provided with an external short-circuit part.

When the internal pressure of the rechargeable battery increases, the external short-circuit part short-circuits the negative electrode of the electrode assembly with the positive electrode thereof outside of the rechargeable battery.

When the external short-circuit part is short-circuited and thus the battery is discharged, a charging state of the electrode assembly becomes low.

For example, the external short-circuit part includes a connection plate that is connected to the negative electrode terminal, and a membrane that is connected to the cap plate to maintain a separated state with the connection plate, and the membrane may be inversely deformed to contact the connection plate.

The cap plate and the membrane are connected to the positive electrode terminal.

The connection plate may be provided with a through-hole so as not to disturb the inverse deformation of the membrane.

The through-hole may allow foreign materials and moisture from outside to permeate through the space between the connection plate and the membrane.

The above information disclosed in this Background section is only for enhancement of understanding of the background of the described technology and therefore it may contain information that is not part of the prior art that is already known to a person of ordinary skill in the art.

SUMMARY

An exemplary embodiment provides a rechargeable battery with an external short-circuit part having a feature of preventing external foreign materials and moisture from permeating as well as discharging internal pressure when a membrane is inversely deformed.

A rechargeable battery according to an exemplary embodiment includes: a case accommodating an electrode assembly; a cap plate sealing an opening of the case; a first electrode terminal and a second electrode terminal, each extending through the cap plate and electrically connected to the electrode assembly; and an external short-circuit part electrically separating or short-circuiting the first and second electrode terminals outside of the electrode assembly. The external short-circuit part includes: a membrane sealing a short-circuit hole formed in the cap plate; a connection plate electrically connected to the first electrode terminal and disposed at one side of the membrane to be spaced apart therefrom; an insulator combined to a through-hole of the connection plate and having an outlet for discharging internal pressure when the membrane is inversely deformed; and a cap combined to the insulator such that it enables the discharging of the internal pressure and prevents permeation of foreign materials into the outlet.

The connection plate may include a plate portion connected to the first electrode terminal, and a cylindrical portion disposed in the short-circuit hole while protruding toward the membrane from the plate portion and being spaced apart from an inner surface of the short-circuit hole, wherein the through-hole may be formed at a bottom of the cylindrical portion.

The insulator may include an inner insulating portion in the cylindrical portion, and an outer insulating portion on an outer surface of the cylindrical portion such that it is connected to the inner insulating portion.

The inner insulating portion may include a first insertion portion, an upper part of the first insertion portion being open and the first insertion portion being tightly attached to the through-hole, the bottom, and the inner surface of the cylindrical portion, and one or more first barriers spaced apart from an inner side of the first insertion portion in a diametrical direction thereof to form one or more receiving grooves therebetween.

The cap may include one or more second barriers that are inserted into an open side of the first insertion portion to be inserted into the one or more receiving grooves; and a covering portion that is connected to one side of the one or more second barriers and covers the first insertion portion.

The one or more first barriers may include a plurality of first barriers, the one or more receiving grooves may include a plurality of receiving grooves, and the one or more second barriers may include a plurality of second barriers to be combined with the plurality of receiving grooves.

An end portion of a first barrier of the one or more first barriers and an inner surface of the covering portion may form a first gap therebetween, and an end portion of a second barrier of the one or more second barriers and a bottom surface of a receiving groove of the one or more receiving grooves may form a second gap therebetween.

A third barrier of the plurality of first barriers and a fourth barrier of the plurality of second barriers may form a third gap at one side of the first barrier and a fourth gap at the other side of the first barrier.

The outlet, the first gap, the fourth gap, the second gap, and the third gap may be sequentially connected to the final outlet that is formed in the insulator.

The first insertion portion of the inner insulating portion may include an interior engaging groove, and the second barrier of the cap includes an exterior catching protrusion, the catching protrusion extending into the engaging groove, the cap being configured to be lifted up and down.

A first barrier of the plurality of first barriers may be loosely combined with a second barrier of the plurality of second barriers on one side of the first barrier, and the rechargeable battery may have a third gap at the other side of the first barrier.

The insulator may be formed at at least one side of the covering portion such that the external short circuit part may include a final outlet connected to the third gap.

The first insertion portion and a first barrier of the one or more first barriers may be formed in a concentric cylindrical shape.

The first insertion portion and a second barrier of the one or more second barriers may be formed in a concentric cylindrical shape.

A second barrier of the one or more second barriers may include a plurality of portions separated along a circumferential direction.

As described above, provided with the external short-circuit part by combining the cap to the outlet of the insulator that is combined to the through-hole of the connection plate, the exemplary embodiment may prevent the permeation of external foreign materials and moisture and discharge the internal pressure when the membrane is inversely deformed.

DETAILED DESCRIPTION

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention. When a first element is described as being "coupled to" or "connected to" a second element, the first element may be directly "coupled to" or "connected to" the second element, or may be indirectly "coupled to" or "connected to" the second element with one or more intervening elements interposed therebetween.

The drawings and description are to be regarded as illustrative in nature and not restrictive, and like reference numerals designate like elements throughout the specification.

Figure 1:
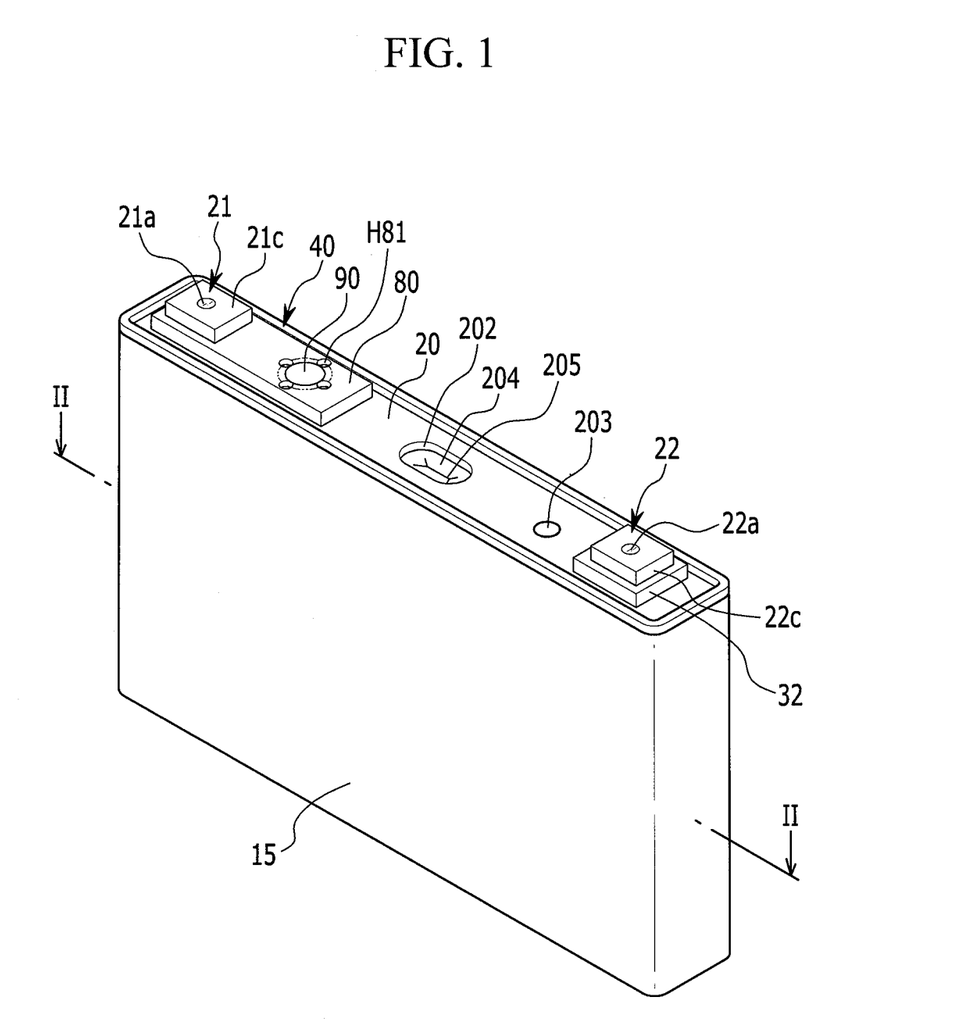
FIG. 1 is a perspective view of a rechargeable battery according to a first exemplary embodiment of the present invention.
Figure 2:
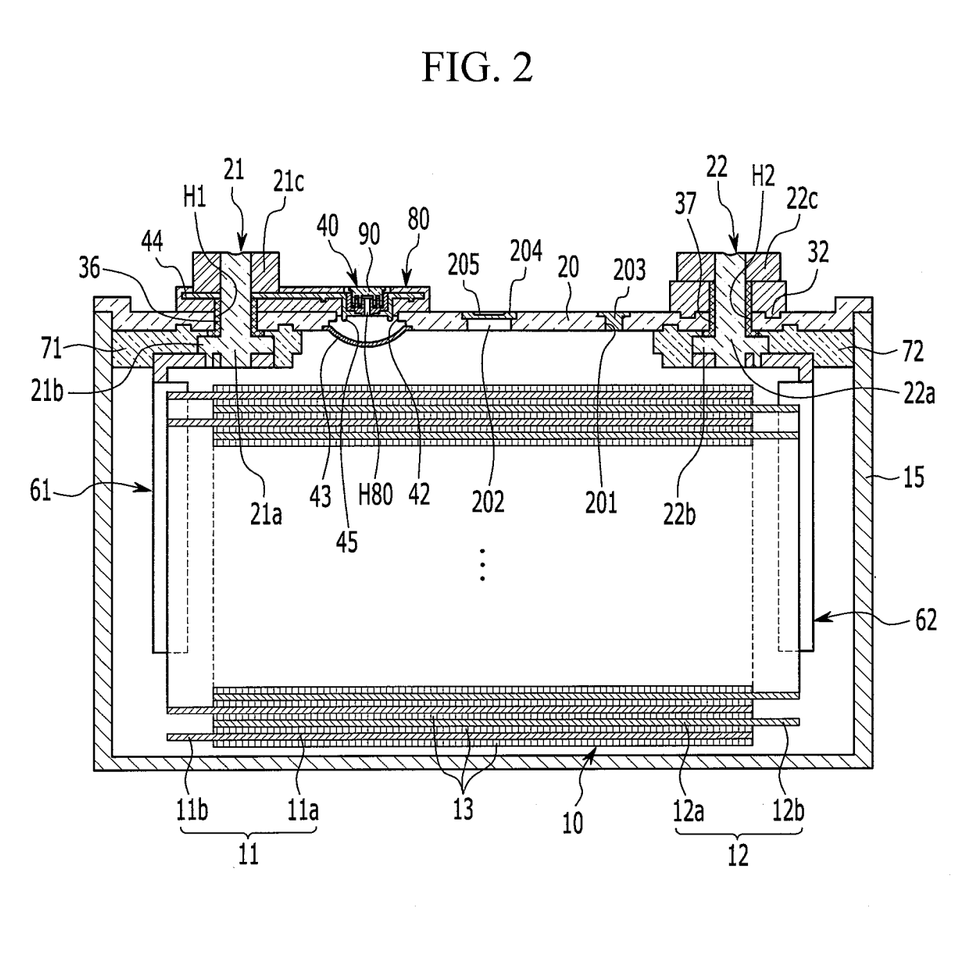
FIG. 2 is a cross-sectional view of FIG. 1 taken along the line II-II.

FIG. 1 is a perspective view of a rechargeable battery according to a first exemplary embodiment of the present invention, and FIG. 2 is a cross-sectional view of FIG. 1 taken along the line II-II.

Referring to FIGS. 1 and 2, a rechargeable battery according to a first exemplary embodiment of the present invention includes: an electrode assembly 10 through which charging and discharging operations are performed; a case 15 for accommodating the electrode assembly 10; a cap plate 20 for sealing an opening of the case 15; first and second electrode terminals 21 and 22 provided in terminal holes (i.e., terminal openings) H1 and H2 of the cap plate 20 to be connected to the electrode assembly 10; and an external short-circuit part 40 electrically separating or connecting the cap plate 20 and the first electrode terminal 21.

The cap plate 20 is electrically connected to the second electrode terminal 22.

For convenience, the first electrode terminal 21 is referred to as a negative electrode terminal, and the second electrode terminal 22 is referred to as a positive electrode terminal.

The electrode assembly 10 is formed by disposing negative and positive electrodes 11 and 12 at opposite sides of a separator 13, which is an insulator, and then spirally winding the negative electrode 11, the separator 13, and the positive electrode 12 into a jelly-roll configuration.

The negative and positive electrodes 11 and 12 respectively include coated regions 11a and 12a where an active material is coated on current collectors of a metal plate, and uncoated regions 11b and 12b where an active material is not coated thereon and thus is formed as exposed current collectors of a metal plate.

The uncoated region 11b of the negative electrode 11 is formed at one end thereof along the wound negative electrode 11.

The uncoated region 12b of the positive electrode 12 is formed at one end thereof along the wound positive electrode 12.

Thus, the uncoated regions 11b and 12b of the positive and negative electrodes 11 and 12 are respectively disposed at opposite ends of the electrode assembly 10.

For example, the case 15 is substantially formed as a cuboid in which space for accommodating the electrode assembly 10 and an electrolyte solution is set, and is formed with an opening for connecting inner and outer spaces (e.g., providing access to the interior of the case 15).

The opening allows the electrode assembly 10 to be inserted into the case 15.

The cap plate 20 is formed of a thin plate, and is welded to the opening of the case 15 to seal it.

The cap plate 20 is further provided with an electrolyte injection opening 201, a vent hole 202, and a short-circuit hole 42.

After combining the cap plate 20 to the case 15 and then welding them, the electrolyte injection opening 201 allows the electrolyte solution to be injected into the case 15.

After the electrolyte solution is injected, the electrolyte injection opening 201 is sealed with a sealing cap 203.

The vent hole 202 is sealed with a vent plate 204 so as to discharge internal pressure of the rechargeable battery.

The vent plate 204 is designed to rupture, to open the vent hole 202, when the internal pressure of the rechargeable battery reaches a preset pressure.

The vent plate 204 is provided with a notch 205 that induces the rupture.

The negative and positive electrode terminals 21 and 22 are provided in the terminal holes H1 and H2 that penetrate the cap plate 20, and are electrically connected to the electrode assembly 10.

That is, the negative electrode terminal 21 is electrically connected to the negative electrode 11 of the electrode assembly 10, while the positive electrode terminal 22 is electrically connected to the positive electrode 12 of the electrode assembly 10.

Thus, the electrode assembly 10 is connected to the exterior of the case 15 through the negative and positive electrode terminals 21 and 22.

The negative and positive electrode terminals 21 and 22 include rivet terminals 21a and 22a respectively provided in the terminal holes H1 and H2 of the cap plate 20, flanges 21b and 22b integrally and widely formed (e.g., having a larger diameter) with the rivet terminals 21a and 22a at an inner side of the cap plate 20, and terminal plates 21c and 22c connected to the rivet terminals 21a and 22a by riveting or welding while being disposed outside of the cap plate 20.

Negative and positive electrode gaskets 36 and 37 are respectively inserted between the rivet terminals 21a and 22a of the negative and positive electrode terminals 21 and 22 and the inner sides of the terminal holes H1 and H2 of the cap plate 20 so as to seal between the rivet terminals 21a and 22a of the negative and positive electrode terminals 21 and 22 and the cap plate 20.

The negative and positive electrode gaskets 36 and 37 are provided to be flanged and to extend between the flanges 21b and 22b and the inner side of the cap plate 20, and further seal between the flanges 21b and 22b and the cap plate 20.

Negative and positive electrode lead tabs 61 and 62 electrically connect the negative and positive electrode terminals 21 and 22 to the uncoated regions 11b and 12b of the negative and positive electrodes 11 and 12 of the electrode assembly 10, respectively.

That is, by combining the negative and positive electrode lead tabs 61 and 62 to lower end portions of the rivet terminals 21a and 22a and then caulking the lower end portions, the negative and positive electrode lead tabs 61 and 62 are connected to the lower end portions of the rivet terminals 21a and 22a as a conductive structure while being supported by the flanges 21b and 22b.

Negative and positive insulators 71 and 72 are respectively provided between the negative and positive electrode lead tabs 61 and 62 and the cap plate 20, and electrically insulate the negative and positive electrode lead tabs 61 and 62 from the cap plate 20.

Further, the negative and positive insulators 71 and 72 are combined to the cap plate 20 at one side, and enclose the negative and positive electrode lead tabs 61 and 62, the rivet terminals 21a and 22a, and the flanges 21b and 22b at the other side, thereby stabilizing a connecting structure therebetween.

The positive electrode terminal 22 further includes a top plate 32 that is interposed between a terminal plate 22c and the cap plate 20.

The positive electrode gasket 37 extends further to be inserted between the rivet terminal 22a of the positive electrode terminal 22 and the top plate 32, and prevents direct electrical contact between the rivet terminal 22a and the top plate 32.

That is, the rivet terminal 22a is electrically connected to the top plate 32 through the terminal plate 22c.

Thus, in order to be positively charged, the top plate 32, the cap plate 20, and the case 15 are electrically connected to the positive electrode terminal 22.

The negative electrode gasket 36 further extends to be inserted between the rivet terminal 21a of the negative electrode terminal 21 and the external short-circuit part 40 (for example, a through-hole of an insulator 80 corresponding to the terminal hole H1).

Depending on the internal pressure of the rechargeable battery, the external short-circuit part 40 is configured to maintain a separated state or to be short-circuited when the internal pressure reaches a preset value.

Figure 3:
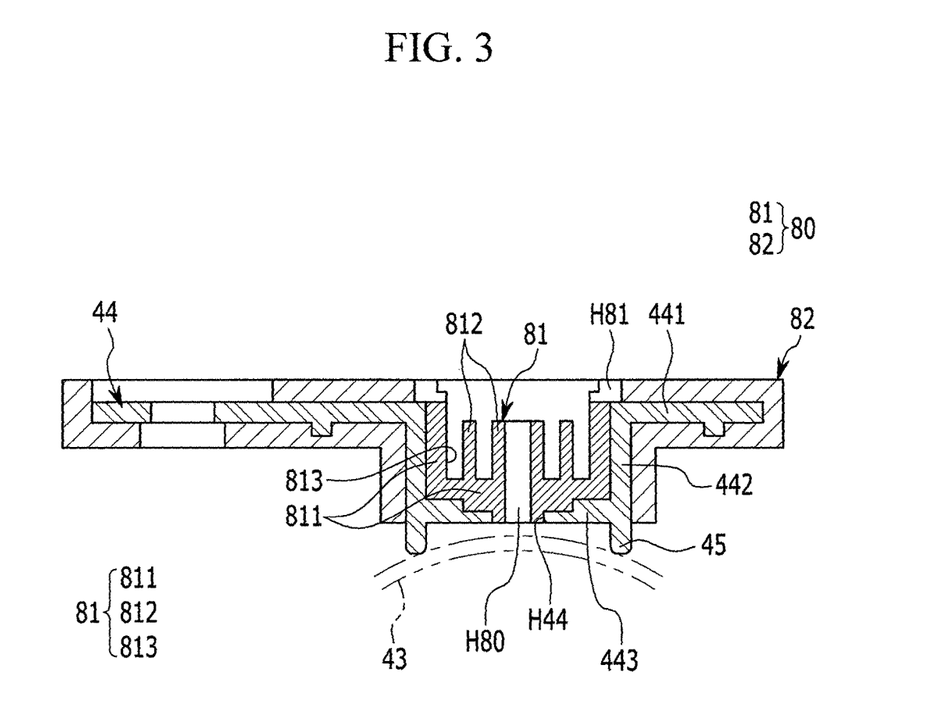
FIG. 3 is a cross-sectional view of a connection plate and an injection molded insulator in an external short-circuit part of FIG. 2.
Figure 4:
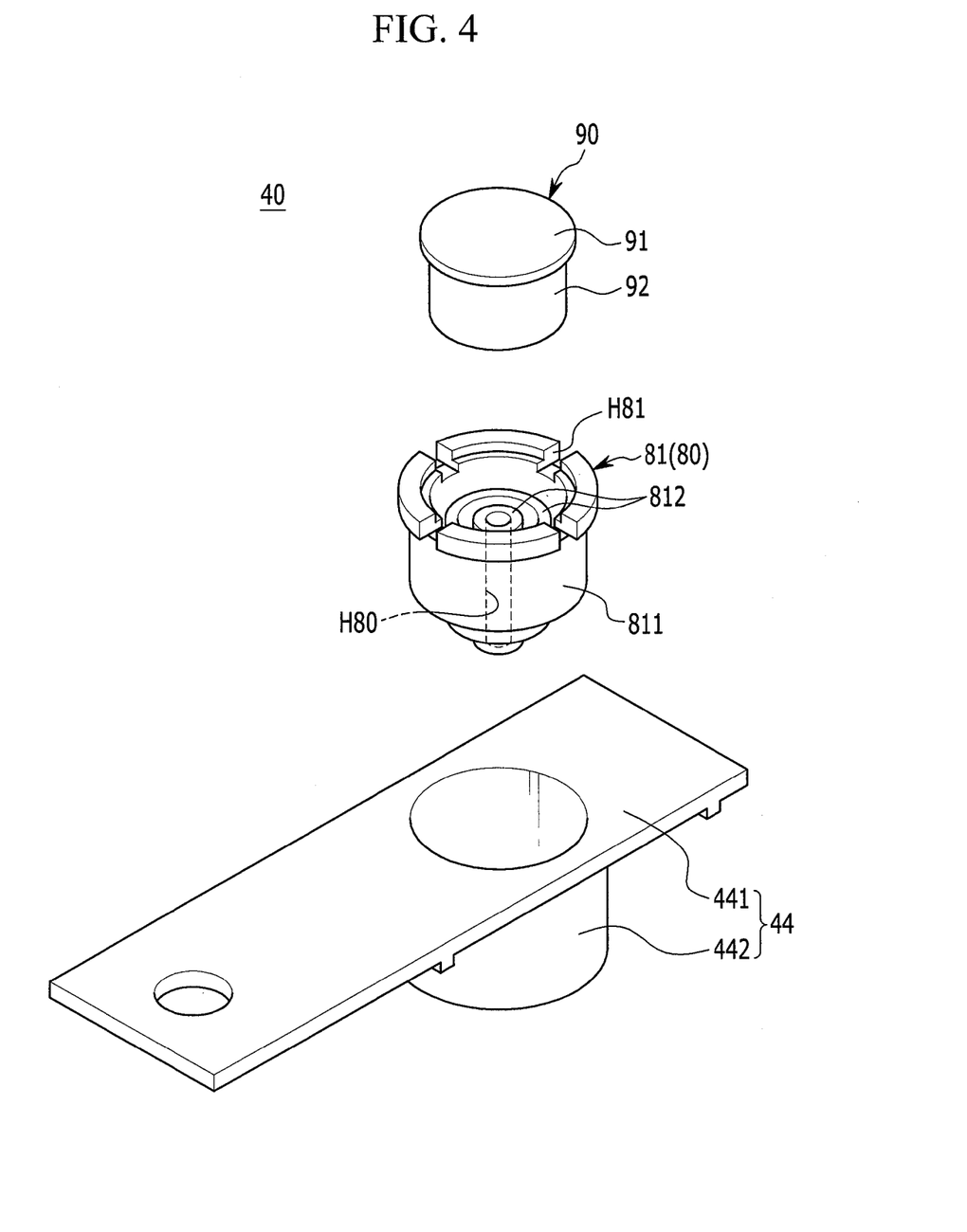
FIG. 4 is an exploded perspective view of the connection plate, an inner insulating portion, and a cap in the external short-circuit part of FIG. 2.
Figure 5:
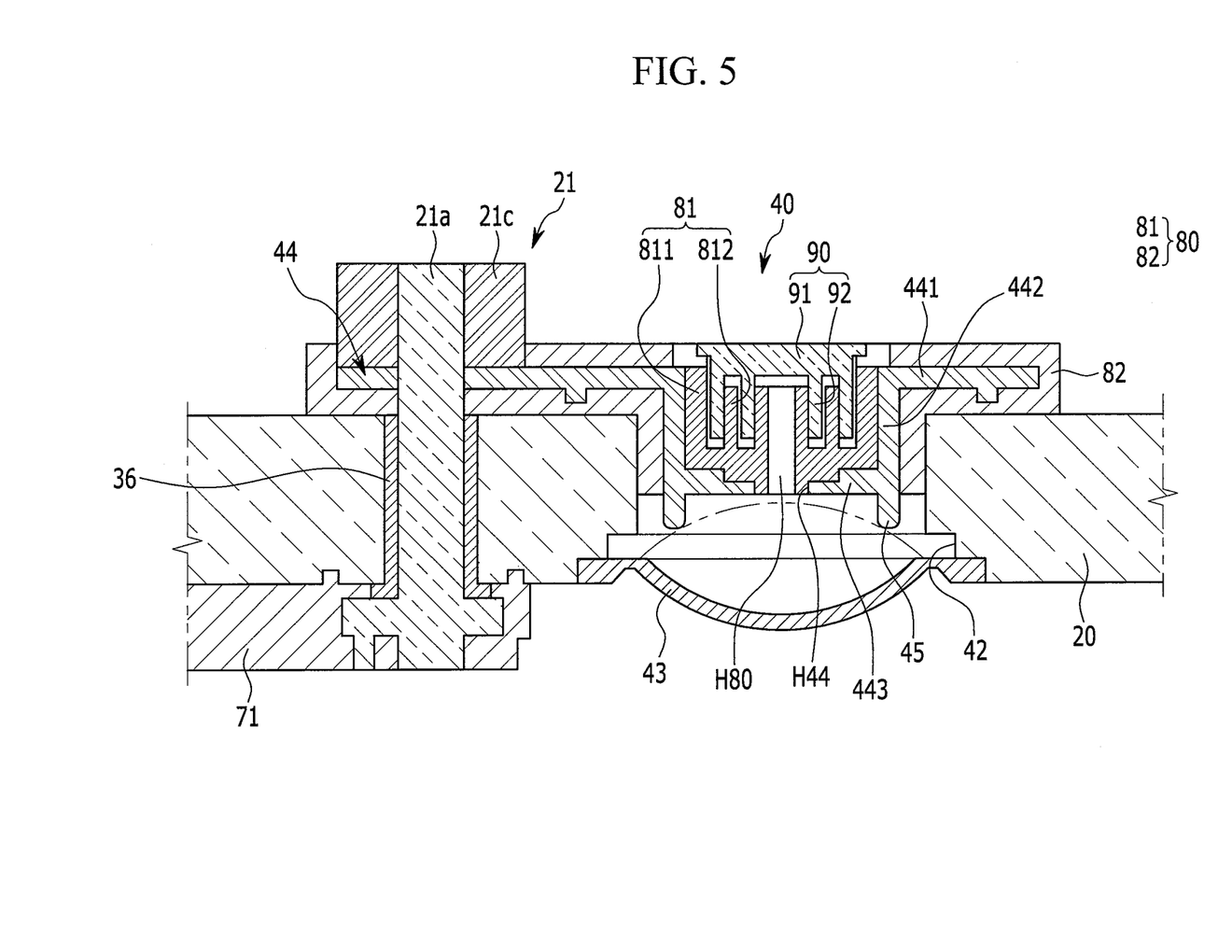
FIG. 5 is an enlarged detailed view of a negative electrode terminal and the external short-circuit portion.

FIG. 3 is a cross-sectional view of a connection plate and an injection molded insulator in the external short-circuit part of FIG. 2, FIG. 4 is an exploded perspective view of the connection plate, an inner insulating portion, and a cap in the external short-circuit part of FIG. 2, and FIG. 5 is an enlarged detailed view of the negative electrode terminal and the external short-circuit portion.

Referring to FIGS. 3 and 4, the external short-circuit part 40 includes: a membrane 43 inversely deformed depending on the internal pressure while sealing the short-circuit hole 42 formed in the cap plate 20; a connection plate 44 electrically connected to the negative electrode terminal 21 and disposed at one side of the membrane 43 to be spaced apart therefrom; the insulator 80 for electrically insulating the connection plate 44 from the membrane 43 and the cap plate 20; and a cap 90 combined to an outlet H80 of the insulator 80.

When the membrane 43 is inversely deformed by increased internal pressure, the connection plate 44 is provided with short-circuit protrusions 45 at a facing side of the membrane 43 to efficiently short-circuit the membrane 43 and the connection plate 44.

The insulator 80 is combined to a through-hole H44 of the connection plate 44, and is provided with the outlet H80 to discharge the internal pressure when the membrane 43 is inversely deformed.

The cap 90 is combined to the insulator 80 to discharge the internal pressure when the membrane 43 is inversely deformed, and prevents foreign materials from permeating into the outlet H80 when the membrane is not deformed.

The insulator 80 is provided on the cap plate 20 to electrically insulate the positively charged cap plate 20 from the connection plate 44 connected to the rivet terminal 21a of the negative electrode terminal 21.

Provided with through-holes corresponding to the terminal hole H1 and the short-circuit hole 42, the insulator 80 does not interfere with installation of the rivet terminal 21a and inversion of the membrane 43.

The connection plate 44 includes a plate portion 441 connected to the negative electrode terminal 21, and a cylindrical portion 442 disposed at an inner side of the short-circuit hole 42 while protruding toward the membrane 43 from the plate portion 441 and being spaced apart from the inner side of the short-circuit hole 42. As used herein, the term "side" includes any surface of an object, and an "inner side" may for example refer to an interior surface of a hollow cylindrical part.

The through-hole H44 is formed at a bottom 443 of the cylindrical portion 442.

The insulator 80 includes an inner insulating portion 81 and an outer insulating portion 82 that are integrally formed with each other.

The inner insulating portion 81 is formed inside of the cylindrical portion 442 of the connection plate 44 such that it discharges the internal pressure when the membrane 43 is inversely deformed and accommodates the cap 90 for preventing permeation of foreign materials and moisture from outside.

The outer insulating portion 82 is formed at external surfaces of the plate portion 441 and the cylindrical portion 442 and is connected to the inner insulating portion 81 at a top surface of the plate portion 441, and electrically insulates the negatively charged connection plate 44 from the positively charged cap plate 20.

Referring to FIGS. 3 to 5, the inner insulating portion 81 includes a first insertion portion 811 that is inserted into the cylindrical portion 442, and first barriers 812 that are provided inside of the first insertion portion 811.

The first insertion portion 811 is tightly attached to the through-hole H44, the bottom 443, and an inner surface of the cylindrical portion 442, and is formed to have its top side opened.

The first barriers 812 are spaced apart from each other inside of the first insertion portion 811 in a diametrical direction thereof to form a receiving groove 813 therebetween.

The cap 90 includes a covering portion 91 for covering one or more second barriers 92 and the first insertion portion 811 such that it is correspondingly combined to the inner insulating portion 81.

The second barrier 92 is inserted into an opened side of the first insertion portion 811 such that it is inserted into the receiving groove 813 of the inner insulating portion 81.

The covering portion 91 is connected to one side of the one or more second barriers 92 to cover the first insertion portion 811.

As an example, the first barrier 812 of the inner insulating portion 81 is formed in plural to form the receiving groove 813 in plural inside of the first insertion portion 811. That is, the inner insulating portion 81 may include a plurality of first barriers 812, forming a plurality of receiving grooves 813.

Correspondingly, the second barrier 92 of the cap 90 is formed in plural to be combined to the receiving groove 813, e.g., the cap 90 may include a plurality of second barriers 92 arranged to fit into a plurality of receiving grooves 813.

In this case, while preventing the foreign materials and moisture from permeating into the inner insulating portion 81, the cap 90 allows the internal pressure to be discharged through the outlet H80 of the inner insulating portion 81 when the membrane 43 is inversely deformed.

The first insertion portion 811 and the first barrier 812 are formed in a concentric cylinder shape in the inner insulating portion 81.

The first insertion portion 811 and the second barrier 92 are also formed in a concentric cylinder shape.

Thus, the second barrier 92 of the cap 90 may be combined to the receiving groove 813 of the inner insulating portion 81.

Figure 6:
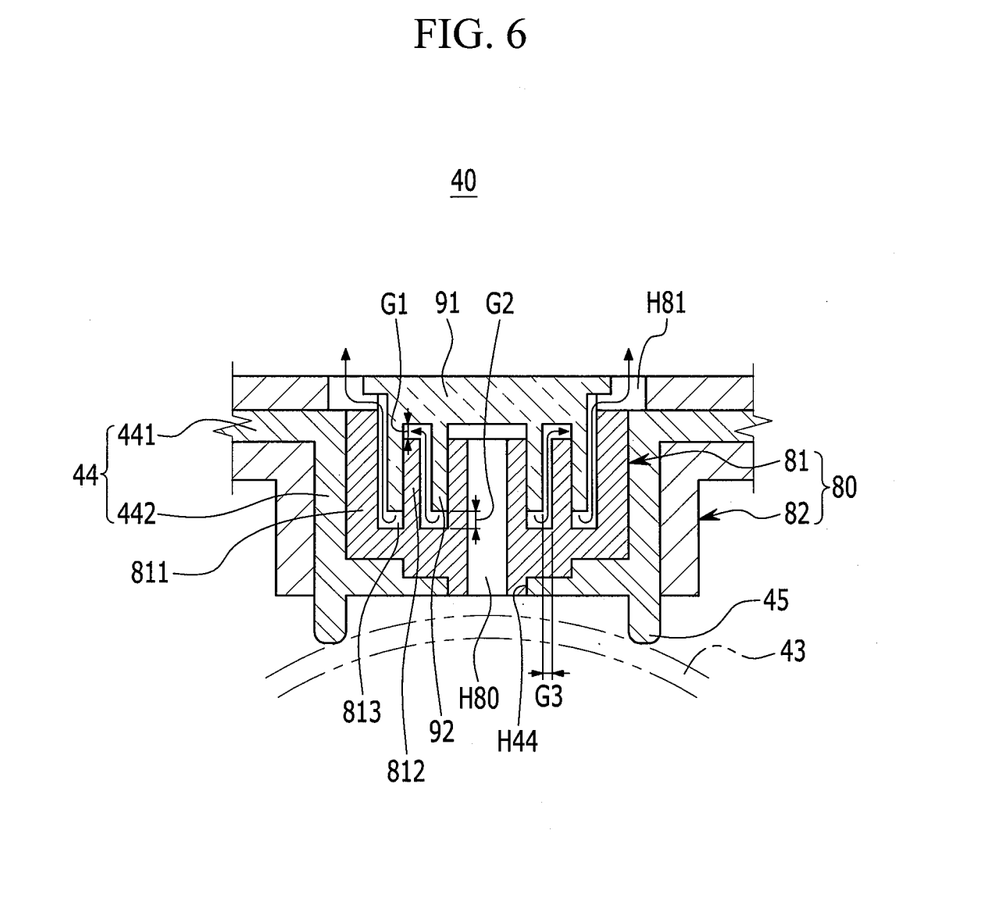
FIG. 6 is an operation state diagram of the external short-circuit part.

FIG. 6 is an operation state diagram of the external short-circuit part.

Referring to FIGS. 5 and 6, an end portion of the first barrier 812 of the inner insulating portion 81 and an inner surface of the covering portion 91 form a first gap G1 therebetween, and an end portion of the second barrier 92 of the cap 90 and a bottom surface of the receiving groove 813 form a second gap G2 therebetween.

When combining the cap 90 to the inner insulating portion 81, the first and second barriers 812 and 92 are loosely combined to have coupling tolerance (not shown) such that they can discharge the internal pressure therebetween when the membrane 43 is inversely deformed.

As an example, the insulator 80 is provided with a final outlet H81 that is formed at at least one side of the covering portion 91 to be connected to a third gap G3.

That is, the final outlet H81 may be formed in plural (e.g., there may be a plurality of final outlets H81) such that they are disposed to be equally spaced at a border of the inner insulating portion 81 and the outer insulating portion 82 (refer to FIGS. 1 and 4).

As the coupling tolerance is formed at the first and second gaps G1 and G2, the outlet H80 of the inner insulating portion 81 is connected thereto to discharge the internal pressure outside through the final outlet H81.

In addition, the first and second barriers 812 and 92 are loosely combined at one side (e.g., the outer surface or outer side of a first barrier 812 may fit loosely against an inner surface or inner side of a second barrier 92), and thus may form a third gap G3 at the other side (e.g., at the inner side of the first barrier 812 and/or at the outer side of the second barrier 92).

The third gap G3, with the coupling tolerance, is also connected to the first and second gaps G1 and G2 such that the outlet H80 of the inner insulating portion 81 is more efficiently connected to discharge the internal pressure outside through the final outlet H81.

When the membrane 43 is inversely deformed by the increased internal pressure of the rechargeable battery to be short-circuited with the short-circuit protrusion 45 of the connection plate 44, a charge (which was charged by a current) in the electrode assembly 10 is discharged through the membrane 43 and the connection plate 44.

As the membrane 43 is inversely deformed, the internal pressure, through the outlet H80 of the inner insulating portion 81, sequentially passes the first gap G1, a third gap G3, the second gap G2, and another third gap G3, thereby being discharged to the final outlet H81.

Further, the first and second barriers 812 and 92 are formed in plural, and the receiving groove 813 is accordingly formed in plural. That is, the inner insulating portion 81 may include a plurality of first barriers 812, forming a plurality of receiving grooves 813, and the cap may include a plurality of second barriers 92.

Thus, a path between the outlet H80 and the final outlet H81 is increased in length.

That is, the first barrier 812 of the inner insulating portion 81 and the second barrier 92 of the cap 90 make both a discharging path of the internal pressure and a permeation path for foreign materials and moisture longer.

Thus, the external short-circuit part 40 may effectively prevent permeation of foreign materials and moisture, in addition to efficiently discharging the internal pressure.

For example, the cap 90 may be formed of a polypropylene (PP) resin, a polycarbonate (PC) resin, a polycarbosilane (PCS) precursor, or a polycarbonate-acrylonitrile butadiene styrene (PC-ABS) composite resin.

Various exemplary embodiments of the present invention will now be described.

Compared with the configurations of the first exemplary embodiment and the aforementioned exemplary embodiment, a description of the same configurations will be omitted while different configurations will be described.

Figure 7:
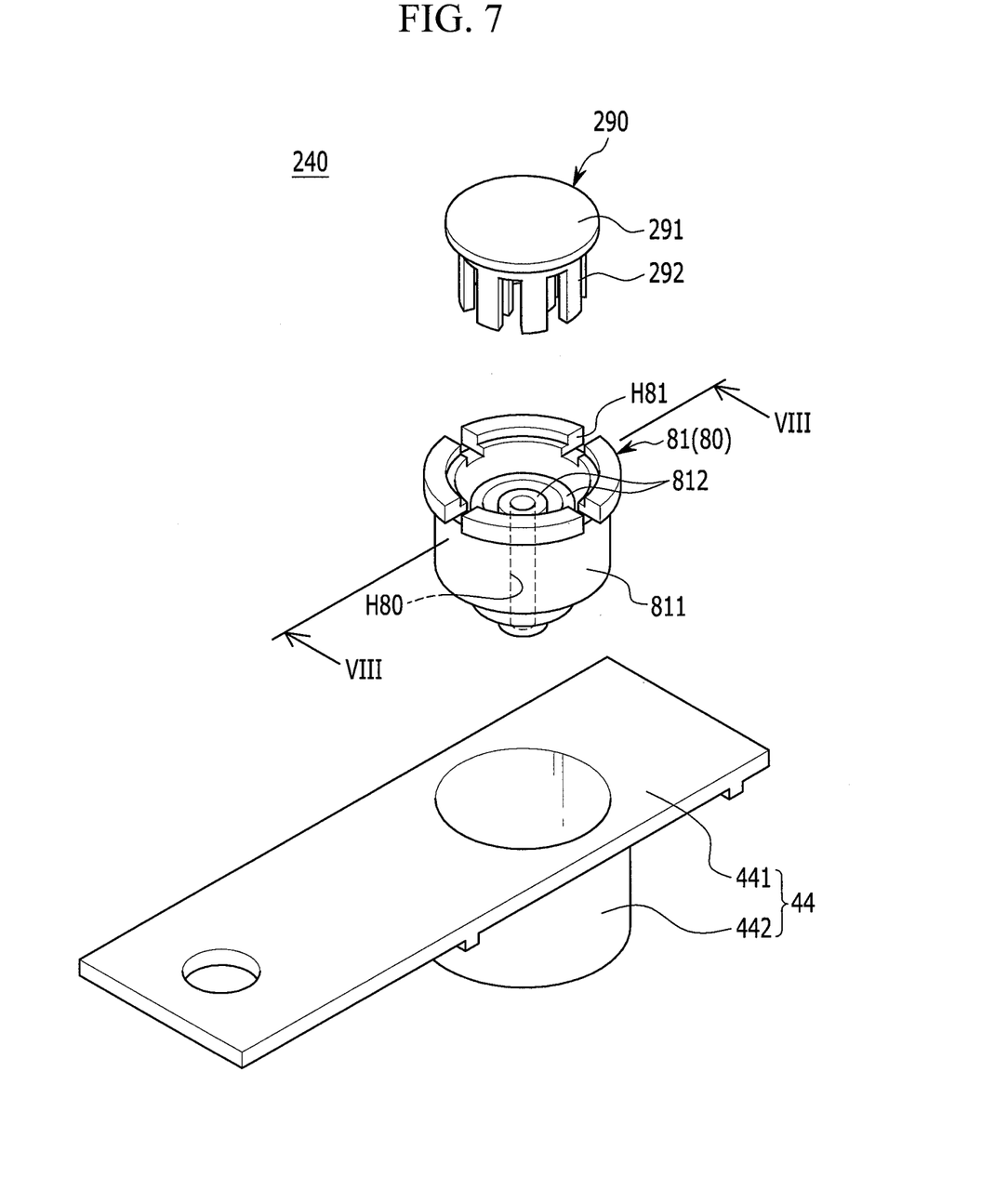
FIG. 7 is an exploded perspective view of a connection plate, an inner insulating portion, and a cap in an external short-circuit part according to a second exemplary embodiment of the present invention.
Figure 8:
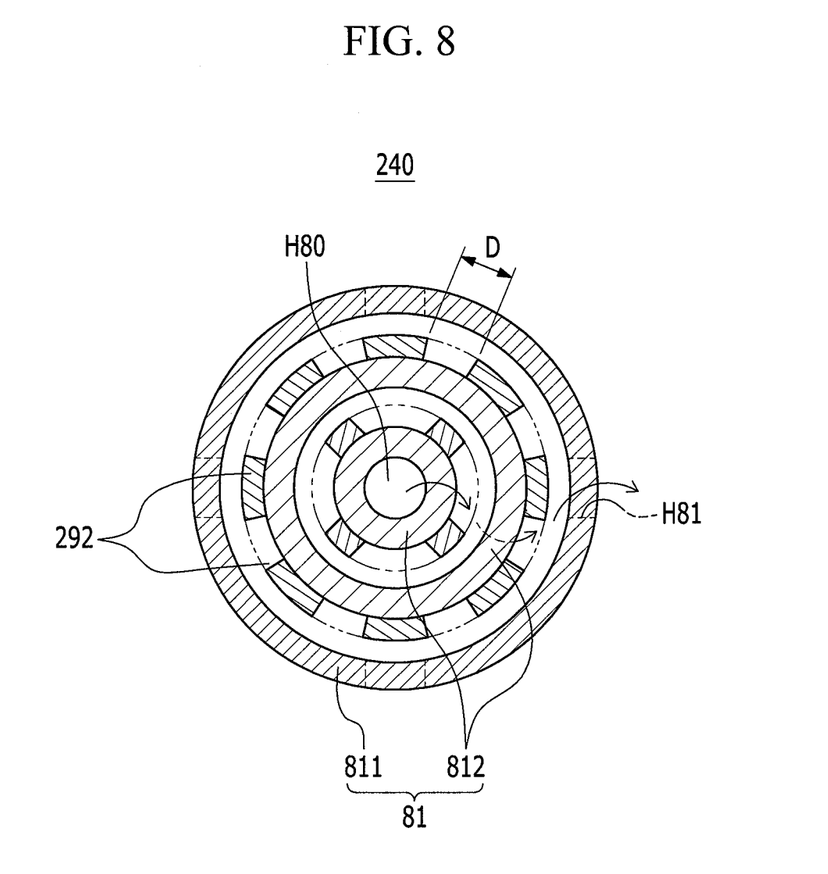
FIG. 8 is a cross-sectional view of the external short-circuit portion of FIG. 7 assembled and then taken along the line VIII-VIII.

FIG. 7 is an exploded perspective view of a connection plate, an inner insulating portion, and a cap in an external short-circuit part according to a second exemplary embodiment of the present invention, and FIG. 8 is a cross-sectional view showing the external short-circuit portion of FIG. 7 assembled and then taken along the line VIII-VIII.

Referring to FIGS. 7 and 8, in an external short-circuit part 240 according to the second exemplary embodiment, a second barrier 292 is separated along a circumferential direction to be formed in plural, e.g., the second barrier 292 is composed of a plurality of portions, separated along a circumferential direction.

Neighboring portions of the second barrier 292 are spaced apart from each other by a distance D and connected to a covering portion 291.

As the membrane 43 is inversely deformed, the internal pressure, through the outlet H80 of the inner insulating portion 81, sequentially passes through the first gap G1, a third gap G3, the second gap G2, another third gap G3 (refer to FIG. 6), and further the portion of the distance D between the second barriers 292 that is set in the circumferential direction, thereby being discharged to the final outlet H81. For example, the internal pressure is relieved through the outlet H80 and through the gaps G1, G3, G2, G3, and the final outlet H81.

The distance D between the second barriers 292 makes it possible to discharge the internal pressure even if a cap 290 is forcedly combined to the inner insulating portion 81.

Figure 9:
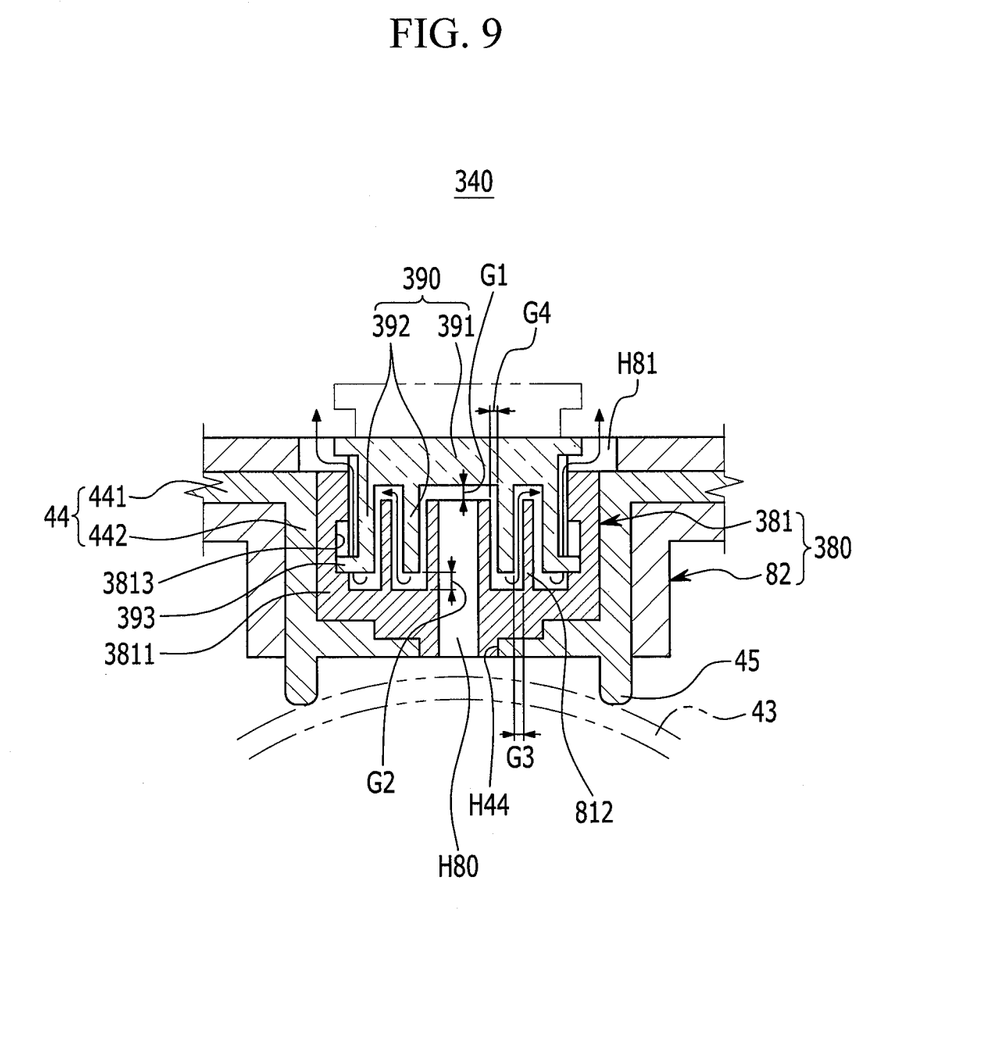
FIG. 9 is a cross-sectional view of an external short-circuit part of a rechargeable battery according to a third exemplary embodiment of the present invention.

FIG. 9 is a cross-sectional view of a rechargeable battery according to a third exemplary embodiment of the present invention.

Referring to FIG. 9, in an external short-circuit part 340 of a rechargeable battery according to the third exemplary embodiment, the first barrier 812 and a second barrier 392 form a third gap G3 at one side of the second barrier 392 and a fourth gap G4 at the other side of the second barrier 392.

The outlet H80, the first gap G1, the fourth gap G4, the second gap G2, and the third gap G3 are sequentially connected to the final outlet H81 that is formed in an insulator 380.

Thus, as the membrane 43 is inversely deformed, the internal pressure, through the outlet H80 of an inner insulating portion 381, sequentially passes the first gap G1, the fourth gap G4, the second gap G2, and the third gap G3, thereby being discharged to the final outlet H81. For example, the internal pressure is relieved through the outlet H80 and through the gaps G1, G4, G2, G3, and the final outlet H81.

In addition, a first insertion portion 3811 of the inner insulating portion 381 is formed inside with an engaging groove 3813, and the second barrier 392 of a cap 390 is formed with a catching protrusion 393 such that it is combined to the engaging groove 3813 to be lifted up and down.

When the membrane 43 is inversely deformed to discharge the internal pressure (e.g., to relieve the internal pressure), the internal pressure, through the outlet H80 of the inner insulating portion 381, sequentially passes through the first gap G1, the fourth gap G4, the second gap G2, and the third gap G3, thereby being discharged to the final outlet H81. For example, the internal pressure is relieved through the outlet H80 and through the gaps G1, G4, G2, G3, and the final outlet H81.

The internal pressure also affects a covering portion 391 such that it lifts up the cap 390 from the inner insulating portion 381.

Thus, the internal pressure may be more efficiently discharged to the opened final outlet H81.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

| Description of Symbols | |
|---|---|
| 10: electrode assembly | 11: negative electrode |
| 11a, 12a: coated region | 11b, 12b: uncoated region |
| 12: positive electrode | 13: separator |
| 15: case | 20: cap plate |
| 21: first electrode terminal (negative electrode terminal) | |
| 21a, 22a: rivet terminal | |
| 21b, 22b: flange | 21c, 22c: terminal plate |
| 22: second electrode terminal (positive electrode terminal) | |
| 32: top plate | 36, 37: negative, positive electrode gasket |
| 40, 240, 340: external short-circuit part | |
| 42: short-circuit hole | 43: membrane |
| 44: connection plate | 45: short-circuit protrusion |
| 61, 62: negative, positive electrode lead tab | |
| 71, 72: negative, positive insulator | |
| 80, 380: insulator | 81, 381: inner insulating portion |
| 82: outer insulating portion | 90, 290, 390: cap |
| 91, 291, 391: covering portion | 92, 292, 392: second barrier |
| 201: electrolyte injection opening | 202: vent hole |
| 203: sealing cap | 204: vent plate |
| 205: notch | 393: catching protrusion |
| 441: plate portion | 442: cylindrical portion |
| 443: bottom | 811, 3811: first insertion portion |
| 812: first barrier | 813, 3813: receiving groove, engaging groove |
| D: distance | G1, G2, G3, G4: first, second, third, fourth gap |
| H1, H2: terminal hole | H44: through-hole |
| H80: outlet | H81: final outlet |

What is claimed is:

1. A rechargeable battery comprising:
   a case accommodating an electrode assembly;
   a cap plate sealing an opening of the case;
   a first electrode terminal and a second electrode terminal, each extending through the cap plate and electrically connected to the electrode assembly; and
   an external short-circuit part electrically separating or short-circuiting the first and second electrode terminals outside of the electrode assembly, wherein
   the external short-circuit part comprises:
      a membrane sealing a short-circuit hole formed in the cap plate;
      a connection plate electrically connected to the first electrode terminal and disposed at one side of the membrane to be spaced apart therefrom;
      an insulator combined to a through-hole of the connection plate and having an outlet for discharging internal pressure when the membrane is inversely deformed; and
      a cap combined to the insulator such that it enables the discharging of the internal pressure and prevents permeation of foreign materials into the outlet,
   wherein the connection plate comprises:
      a plate portion connected to the first electrode terminal; and
      a cylindrical portion disposed in the short-circuit hole while protruding toward the membrane from the plate portion and being spaced apart from an inner surface of the short-circuit hole,
wherein the through-hole is formed at a bottom of the cylindrical portion,
wherein the insulator comprises an inner insulating portion in the cylindrical portion, and an outer insulating portion on an outer surface of the cylindrical portion such that it is connected to the inner insulating portion.

2. The rechargeable battery of claim 1, wherein the inner insulating portion comprises:
   a first insertion portion, an upper part of the first insertion portion being open and the first insertion portion being tightly attached to the through-hole, the bottom, and the inner surface of the cylindrical portion; and
   one or more first barriers spaced apart from an inner side of the first insertion portion in a diametrical direction thereof to form one or more receiving grooves therebetween.

3. The rechargeable battery of claim 2, wherein the cap comprises:
   one or more second barriers that are inserted into an open side of the first insertion portion and into the one or more receiving grooves; and
   a covering portion that is connected to one side of the one or more second barriers and covers the first insertion portion.

4. The rechargeable battery of claim 3, wherein:
   the one or more first barriers comprise a plurality of first barriers,
   the one or more receiving grooves comprise a plurality of receiving grooves, and
   the one or more second barriers comprise a plurality of second barriers to be combined with the plurality of receiving grooves.

5. The rechargeable battery of claim 4, wherein an end portion of a first barrier of the plurality of first barriers and an inner surface of the covering portion define a first gap therebetween, and an end portion of a second barrier of the plurality of second barriers and a bottom surface of a receiving groove of the plurality of receiving grooves define a second gap therebetween.

6. The rechargeable battery of claim 5, wherein a third barrier of the plurality of first barriers and a fourth barrier of the plurality of second barriers form a third gap at one side of the third barrier and a fourth gap at the other side of the third barrier.

7. The rechargeable battery of claim 6, wherein the outlet, the first gap, the fourth gap, the second gap, and the third gap are sequentially connected to a final outlet that is formed in the insulator.

8. The rechargeable battery of claim 7, wherein the first insertion portion of the inner insulating portion comprises an interior engaging groove, and the second barrier of the cap comprises an exterior catching protrusion, the exterior catching protrusion extending into the engaging groove, the cap being configured to be lifted up and down.

9. The rechargeable battery of claim 4, wherein a first barrier of the plurality of first barriers is loosely combined with a second barrier of the plurality of second barriers on one side of the first barrier, and the rechargeable battery has a third gap at the other side of the first barrier.

10. The rechargeable battery of claim 9, wherein the insulator is formed at at least one side of the covering portion such that the external short-circuit part comprises a final outlet connected to the third gap.

11. The rechargeable battery of claim 3, wherein the first insertion portion and a first barrier of the one or more first barriers are formed in a concentric cylindrical shape.

12. The rechargeable battery of claim 11, wherein the first insertion portion and a second barrier of the one or more second barriers are formed in a concentric cylindrical shape.

13. The rechargeable battery of claim 11, wherein a second barrier of the one or more second barriers comprises a plurality of portions separated along a circumferential direction.

* * * * *